United States Patent [19]
Yves et al.

[11] Patent Number: 5,498,341
[45] Date of Patent: Mar. 12, 1996

[54] PROCESS FOR ULTRAFILTRATION OF STABILIZED EMULSIONS

[75] Inventors: Aurelle Yves, Aucamville, France;
Belkacem Mohamed, Alger, Algeria;
Hadjiev Dimitri, Toulouse, France;
Edmond Julien, Saint Jean, France;
Cotteret Jacques, Millery, France

[73] Assignee: Elf Antar France, Courbevoie, France

[21] Appl. No.: 193,207

[22] PCT Filed: Jun. 15, 1993

[86] PCT No.: PCT/FR93/00577
§ 371 Date: Apr. 18, 1994
§ 102(e) Date: Apr. 18, 1994

[87] PCT Pub. No.: WO93/25298
PCT Pub. Date: Dec. 23, 1993

[30] Foreign Application Priority Data

Jun. 16, 1992 [FR] France .................. 92 07262

[51] Int. Cl.⁶ ............................................. B01D 61/00
[52] U.S. Cl. ................... 210/651; 210/799; 134/10
[58] Field of Search ........................ 210/651, 650, 210/652, 653, 654, 799, 753, 754; 134/10

[56] References Cited

U.S. PATENT DOCUMENTS

| | | | |
|---|---|---|---|
| 4,201,664 | 5/1980 | Kekal | 210/654 |
| 4,332,686 | 6/1982 | Gerlach et al. | 210/651 |
| 4,638,766 | 1/1987 | Bunch et al. | 210/652 |
| 4,780,211 | 10/1988 | Lien | 210/654 |
| 4,865,742 | 9/1989 | Falletti | 210/651 |
| 4,978,454 | 12/1990 | Sweet | 210/651 |
| 5,137,654 | 8/1992 | Burke | 210/652 |

FOREIGN PATENT DOCUMENTS 1185838  3/1970  United Kingdom ............. 210/797

OTHER PUBLICATIONS

Robert L. Goldsmith, "Ultrafiltration of Soluble Oil Wastes" Journal UPCF, vol. 46, No. 9, Sep. 1974, pp. 2183–2192.

Primary Examiner—Ana M. Fortuna
Attorney, Agent, or Firm—Burgess, Ryan and Wayne

[57] ABSTRACT

A process is provided for the ultrafiltration of stabilized emulsions, such as cutting oils, which comprises circulating the emulsion through a chamber partially bounded by a porous membrane, and before the emulsion enters the said chamber, a small quantity of salt is introduced into it, corresponding to a weight ratio of salt/oil present in the emulsion between 0.01 and 0.2.

5 Claims, 3 Drawing Sheets

PROCESS FOR ULTRAFILTRATION OF STABILIZED EMULSIONS

BACKGROUND OF THE INVENTION

1. Field of the Invention

The present invention relates to a process for ultrafiltration of stabilized emulsions, for example of used cutting oils, and more particularly to such a process consisting in introducing a small quantity of salt into the emulsion with a view to destabilizing it, that is to say without preliminary separation of the water and of the oil before its delivery to the ultrafiltration membrane.

2. Description of the Related Art

A cutting oil is a mixture of mineral oil, of surface-active agents, of cosurfactants and of many various additives (bactericides, extreme pressure agents, lubricants, corrosion inhibitors, wetting agents and the like). This combination of constituents which are emulsifiable in all proportions with water is commonly employed at concentrations which vary from 1 to 10% of oil per 90 to 99% of water. Cutting oil emulsions are employed in all operations for machining and shaping metals and cutting stones in order to provide the following functions at the cutting tool:

lubrication and reduction in friction, cooling, reduction in wear and corrosion, removal of the impurities (swarf, dust etc.).

These emulsions operate in a closed circuit on machine tools until they lose their effectiveness over some months because of a slow bacterial degradation and because of being contaminated with impurities. They must consequently be replaced at regular intervals. The organic pollution caused by a direct discharge of these spent emulsions into natural surroundings can be damaging to the environment. The problem of the treatment of these spent cutting oil emulsions must therefore be faced.

Stabilized emulsions cannot be treated by conventional methods of separation which are employed for unstabilized emulsions, namely: phase separation, flotation or coalescence with a particle or fibre bed or hydrocyclones, because the oil droplets are too small to be capable of being separated by gravity separation. In addition, the presence of the surface-active agents and of the cosurfactants prevents any coalescence of the oil droplets because of the existence of an electrical and/or mechanical barrier.

The treatment methods which are employed at present can be classified into three categories:

Treatment processes using a thermal route: Two types of treatment can be distinguished; the simplest one consists of direct burning of the spent emulsion; the other type is based on an evaporation. The aqueous phase is thus evaporated off and the oil is recovered at the end of the operation. These two methods are adapted to all types of cutting fluid but have a major disadvantage, namely a very high energy consumption.

Physicochemical treatment processes: These processes are based on a destabilization of the spent oil-water emulsion, which is often referred to as "breaking the emulsion". This breaking is generally obtained by the action of chemical reactants of acidic, salt or polyelectrolyte type; the subsequent separation of the water and of the oil is generally carried out by simple phase separation. An example of this type of breaking process is described in document FR-A-2,656,812. Although resulting in good separation efficiencies after quite long phase separation periods, these processes exhibit two major disadvantages. The first disadvantage is related to the large quantities of reactants to be employed and is reflected in the substitution of an acidic or saline pollution for an initial organic pollution. The second major disadvantage of these techniques is that the breaking is comparable to a chemical reaction and is therefore found to be stoichiometric, that is to say that it requires an optimum dosage of the reactants employed. It is therefore essential to carry out tests as during a flocculation in order to determine beforehand the optimum concentrations of salts, acids or polyelectrolytes to be employed.

Ultrafiltration processes: In order to separate the oil from the water by ultrafiltration, the emulsion containing cutting oil droplets with a diameter of less than 5 µm is circulated through an ultrafilter equipped with a water-permeable porous membrane whose pores have a diameter of approximately 100 Å. Treatment processes employing ultrafiltration exhibit undoubted advantages. They consume only little energy, the treatment plants are small in size and, after treatment, the water is free from cutting oil. In addition, no human maintenance is needed continuously, as in the case of the physicochemical processes and consequently they can be easily automated and this is a considerable advantage in the present context. However, this ultrafiltration technique involves limitations which are related especially to the viscosity of the emulsion which will have a direct effect on the flow of the permeate and the formation, in the course of time, of a so-called "polarization" layer on the membrane which is produced by the gradual accumulation of the oil droplets. When this layer contains from 30 to 40% of oil, it has the consistency of a particularly viscous whitish gel. The blocking thus obtained causes a very appreciable decrease in the water-permeability of the membrane, that is to say a reduction in the flow of permeate passing through it and the elimination of the capillary separation action in the blocked regions of the membrane, which is reflected in a leakage of oil and poor oil-water separation. To overcome this major disadvantage of the ultrafiltration method it is known to lower the viscosity of the emulsion either by diluting it or by completely or partially breaking the emulsion by introducing salts, organic compounds or acids or simply by diluting the emulsion. In the prior art this chemical destabilization is accompanied by a phase separation preceding or following the ultrafiltration. This type of destabilization prior to the ultrafiltration consists in treating two different phases, the oil separated off beforehand and the residual emulsion to be ultrafiltered, the viscosity of which has thus been reduced.

These improvements in the prior art for the separation of stable emulsions by ultrafiltration nevertheless do not make it possible to develop these ultrafiltration processes economically on an industrial scale because two stages are needed to improve the flow of permeate through the membrane, one of these being destabilization by breaking the emulsion. Furthermore, an oil pollution is replaced with a considerable saline pollution in the case of which no favourable solution is available. In addition, human supervision is necessary and a process of this type can be only partially automated.

The present invention is therefore aimed at improving the ultrafiltration processes using a membrane in order to improve their performance, that is to say to increase the flow of permeate, to limit the problems of blocking and of formation of the polarization layer, and to reduce the membrane areas used at present, but to do this in a single stage, without preliminary destabilization by breaking the emulsion into two phases, of "oil" and "lower viscosity emulsion".

SUMMARY OF THE INVENTION

The subject of the present invention is therefore a process for ultrafiltration of stabilized "oil-in-water" emulsions, consisting in circulating the emulsion through a chamber partially bounded by a porous membrane, characterized in that, before the emulsion enters the said chamber, a small quantity of salt is introduced into it, corresponding to a weight ratio of salt/oil present in the emulsion of between 0.01 and 0.2.

Halogens and formates of alkaline-earth metals may be found among the salts which are suitable for the process according to the invention. In a preferred embodiment of the invention, calcium and magnesium halides and formates will be preferred.

Nevertheless, the preferred, the most common place and the least costly salt is calcium chloride.

To make use of the process according to the invention, the concentration of calcium chloride in the emulsion would be chosen to be between 0.1 and 1 kg/m$^3$.

The advantage of the process according to the invention lies in the fact that, in contrast in what a person skilled in the art does, only a small quantity of salt is introduced, at most ten times smaller than that needed to produce a destabilization with breaking of the emulsion into oil and dilute emulsion. In the said process of the invention there is no breaking of the emulsion before or in the separation chamber. Consequently, no film of oil is deposited on the surface of the membrane and therefore no polarization gel is formed. The membrane is therefore transformed into a surface coalescer which permits the continuous separation of the coalesced oil at the surface of the membrane. The quantity of oil which is separated corresponds stoichiometrically to the quantity of oil present in the ultrafiltrate recovered and which is coalesced on the said membrane. As a result, the oil concentration in the circuit for concentrating the ultrafiltrate remains constant and low, in contrast to those described in the state of the art and this, bearing in mind the low viscosity of the medium, favours the production of high permeate flow rates.

An explanation of the phenomenon used by the invention would consist in saying that the presence of a low salt concentration simultaneously promotes the separation of the microdroplets and of the water holding the emulsion and their coalescence at the membrane under the combined effect of the flow pressure and of the hydrodynamic forces, the salt remaining trapped by the membrane. No pollution, be it saline or oily, is possible in this process, and this offers big advantages when compared with the techniques developed by those skilled in the art. Thus, the water recovered is of low hardness and is comparable with some surface waters meeting the standards of drinkability which is required.

BRIEF DESCRIPTION OF THE DRAWINGS

The invention will now be described by way of nonlimiting example with reference to the attached drawings, in which.

DESCRIPTION OF THE PREFERRED EMBODIMENTS

Figure 1:
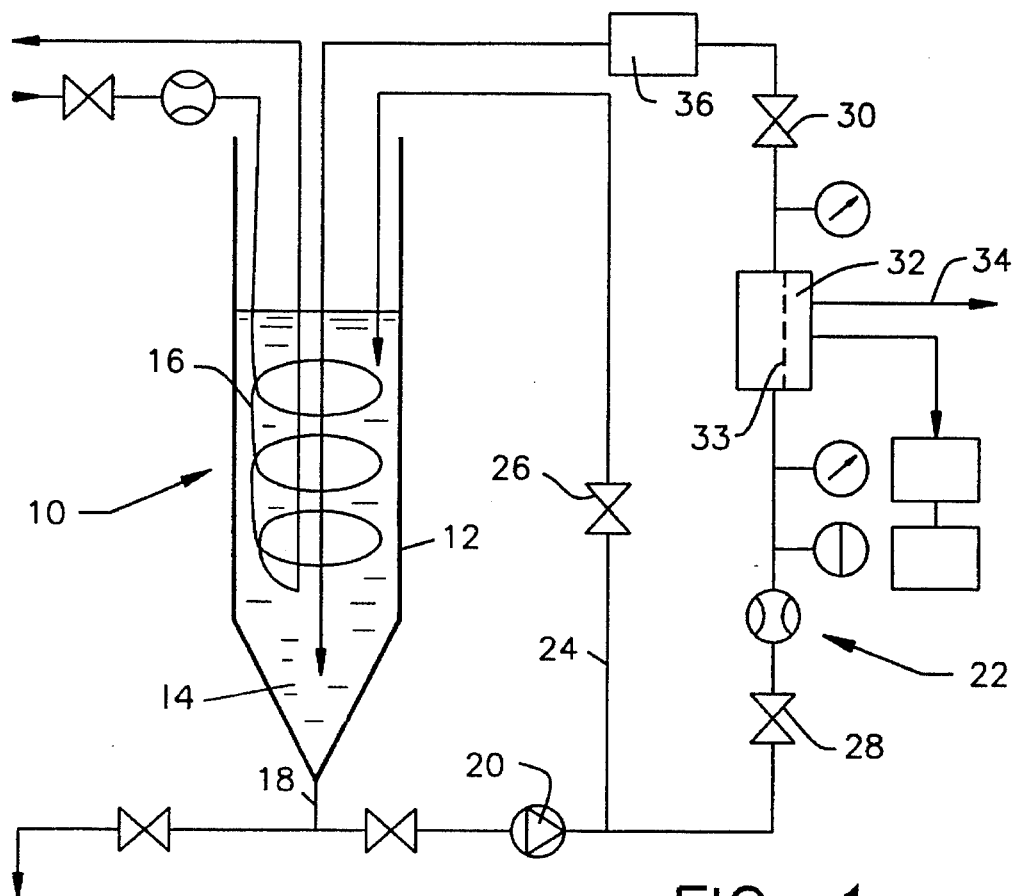
FIG. 1 is a diagrammatic view of an ultrafiltration unit permitting the use of the process according to the invention.

FIG. 1 shows an ultrafiltration unit 10 comprising a tank 12 intended to contain the emulsion 14 to be treated and provided with a cooling circuit 16. The tank 12 comprises an exit 18 which is connected, by means of a centrifugal pump 20, to a filtration circuit 22. A secondary circuit 24, provided with a valve 26, is arranged between the pump 20 and the tank 12 and allows the flow of fluid in the filtration circuit 22 to be controlled.

The filtration circuit 22 comprises two valves 28 and 30 which are arranged upstream and downstream of an ultrafiltration cell provided with a membrane 33, which includes a filtrate exit 34. The filtration circuit 22 additionally comprises a separator 36 downstream of the ultrafiltration cell 32. When the ultrafiltration unit is used the fluid to be treated travels at a high speed through the cell 32, parallel to the membrane 33.

In the first embodiment of the invention, in order to destabilize the emulsion, the ultrafiltration process consists in adding small quantities of a salt 31 to the emulsion before it enters the cell 32. The salt is preferably $CaCl_2$.

To study the influence of the addition of $CaCl_2$ on the flow rate of ultrafiltrate, tests were carried out at different salt concentrations in the case of an emulsion containing 4% of oil. The salt concentration is expressed in mg of salt added to one liter of emulsion.

Figure 2:
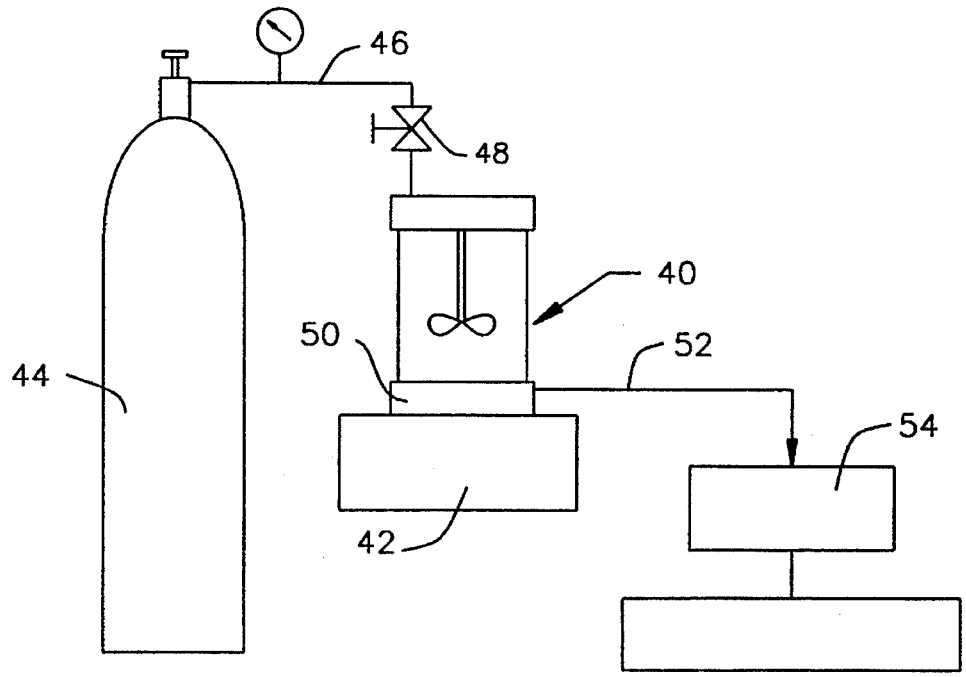
FIG. 2 is a diagrammatic view of a laboratory cell permitting ultrafiltration tests to be made.

These tests were carried out with the laboratory cell shown in FIG. 2. This cell, which is of the "Amicon" type, is shown generally at 40 and includes a stirrer 42. Air under pressure is conveyed from a storage vessel 44 into the cell 40 by means of a conduit 46 which is provided with a valve 48. As in the example of the ultrafiltration unit in FIG. 1, the cell 40 is provided with a membrane 50. The ultrafiltrate flows through a conduit 52 towards a balance 54.

Figure 3:
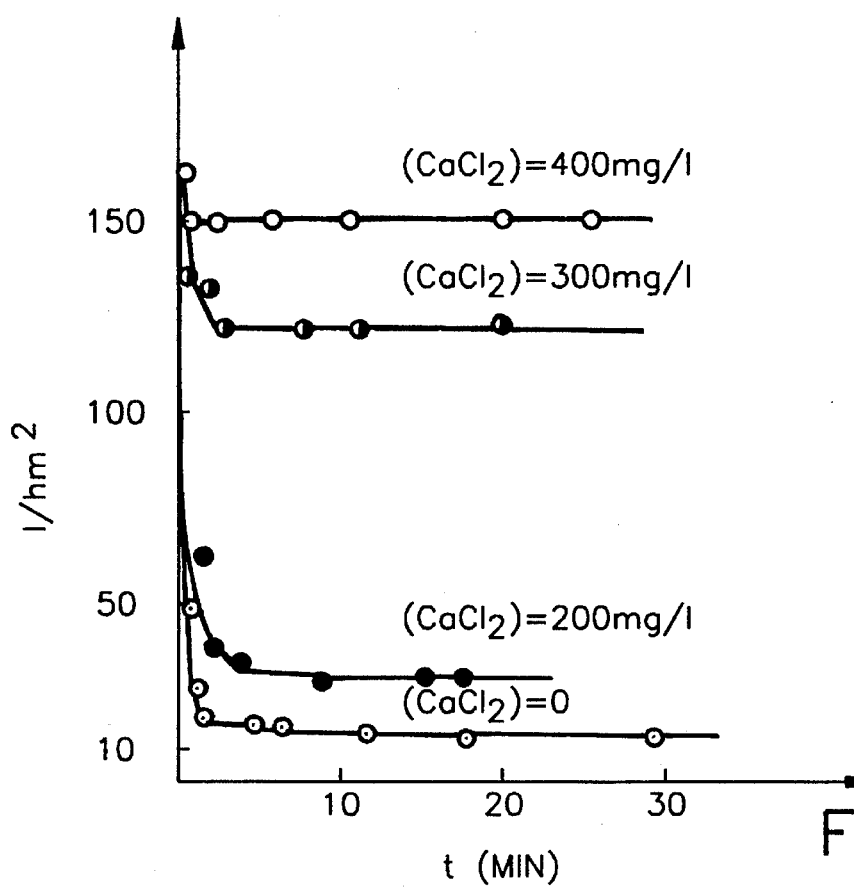
FIG. 3 is a graph of the change in the flow rate of ultrafiltrate as a function of the time, produced with the cell of FIG. 2.

FIG. 3 shows the change in the flow rate of ultrafiltrate as a function of time at different concentrations of $CaCl_2$. The results shown in FIG. 3 were produced with the cell of FIG. 2 and show a clear improvement in the flow rate of ultrafiltrate at salt concentrations which are higher than 300 mg/l. At the end of the operation, free oil floats at the surface of the retentate.

Although the polarization layer is not removed completely, its effects are attenuated as the salt concentration increases. The calcium chloride has the effect of lowering the potential between the oil droplets; as a result, as the water passes through the membrane, the oil droplets which are concentrated at the latter coalesce and separate from the emulsion. This free oil rises to the surface, and this destabilizes the polarization layer and prevents any gel formation.

Figure 4:
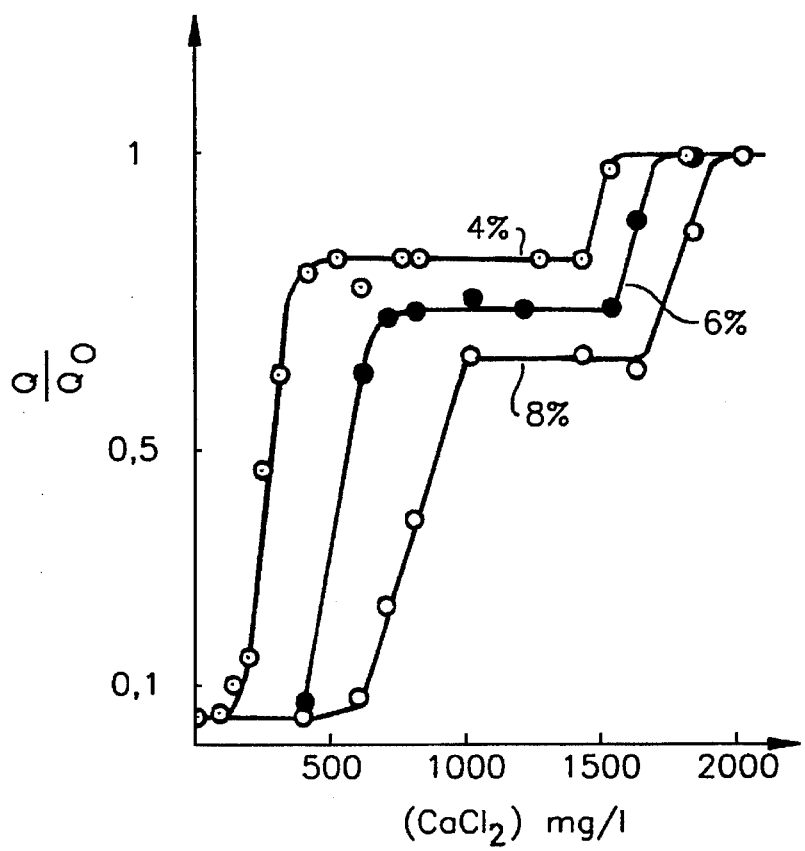
FIG. 4 is a graph of the ratio Q/Qo as a function of the $CaCl_2$ concentration.

The change in the ratio of the flow rate of ultrafiltrate to the flow rate of pure water at 1 bar and 20° C., $Q/Q_o$, is plotted in FIG. 4 as a function of the calcium chloride concentration at different oil concentrations. These tests were also carried out with the cell of FIG. 2. Three plateaus can be discerned in each curve; on the first plateau the flow rate remains equal to that obtained without salt addition. An abrupt increase in the flow rate is then observed until the second plateau; the emulsion is then partially destabilized but no oil-water separation is observed; the optimum salt concentration corresponds to the establishment of this plateau. On the third plateau, the flow rate of ultrafiltrate is equal to that of pure water; the salt concentration corresponding to this plateau is equal to the quantity necessary for a complete breaking given by the literature.

TABLE A

| [Oil] (%) | 4 | 6 | 8 |
|---|---|---|---|
| Opt. [CaCl$_2$] (g/l) | 0.5 | 0.75 | 1 |
| [CaCl$_2$]/[Oil] | 0.125 | 0.125 | 0.125 |
| Q(i) | 159 | 130 | 125 |

The table summarizes the results obtained. The quantity of salt which is necessary increases with the oil concentration in the emulsion but remains well below the quantities used to destabilize the treated emulsions by a physicochemical route. In all cases the flow rate of permeate is relatively high when compared with that obtained without destabilization. The ratio of the optimum quantity of salt to the oil concentration is constant; this makes it possible to determine for any emulsion to be treated the quantity of salt which is necessary for operating under optimum ultrafiltration conditions.

Figure 5:
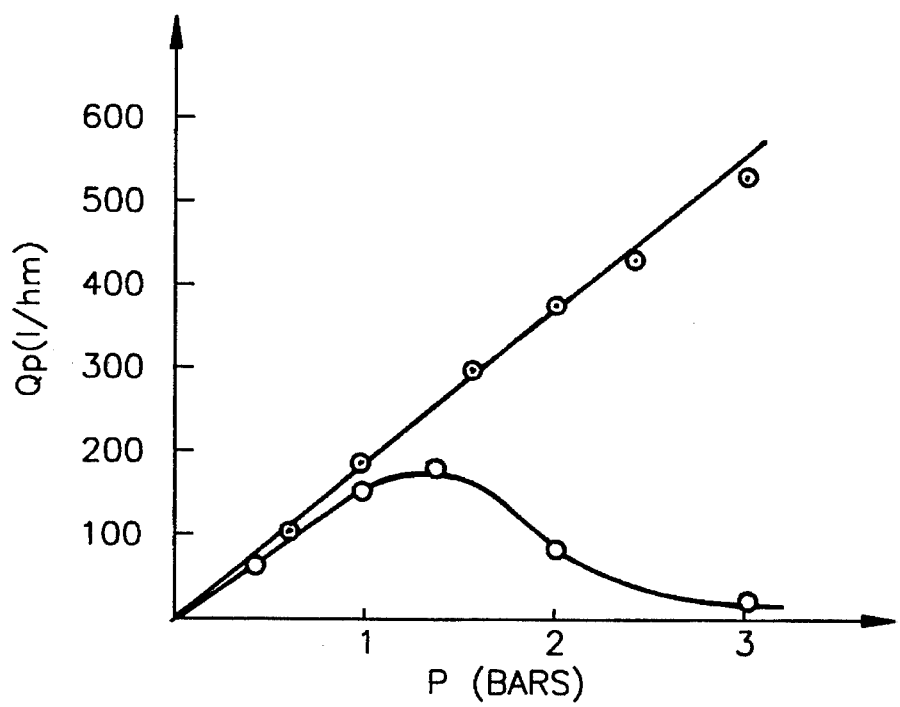
FIG. 5 is a graph of the change in the flow rate as a function of pressure.

The influence of pressure on the flow rate of ultrafiltrate in the case of an emulsion containing 4% of oil and a salt concentration of 400 mg/l is shown in FIG. 5 and was investigated with the cell of FIG. 2. Up to 1.4 bars the permeate flow increases with pressure; a decrease in the flow is then observed at high pressures. Above 3 bars the flow becomes equal to the flow obtained using conventional ultrafiltration.

Figure 6:
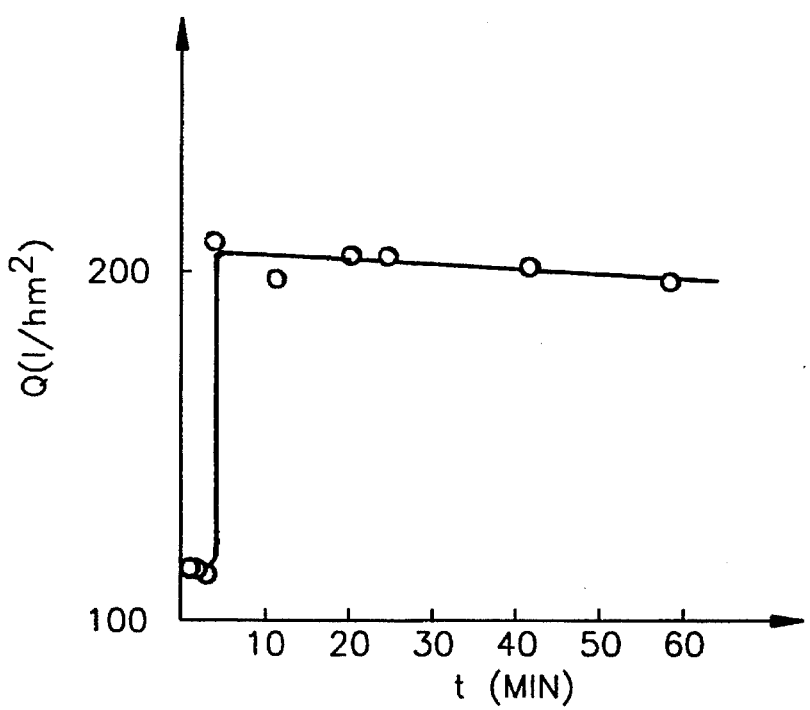
FIG. 6 is a graph of the change in the flow rate of ultrafiltrate as a function of time, produced with the unit of FIG. 1.

FIG. 6 shows the change in the flow rate of ultrafiltrate as a function of time in the case of an oil emulsion at a concentration of 4%. These tests were carried out with the ultrafiltration unit of FIG. 1. 5 g of CaCl$_2$ were added to 10 liters of emulsion after 4 minutes' ultrafiltration. As can be seen in the graph, the flow rate of ultrafiltrate increases instantaneously from 115 to 210 l/hm$^2$ and then remains practically constant.

With the process according to this first embodiment the residual pollution is minimal because the quantities of salt which are added are very small.

According to a second embodiment of the invention it will be advantageously possible to treat the emulsion before it enters the separation chamber without visible addition of salt, solely by diluting with tap water containing a low calcium concentration. In this embodiment, the emulsion is diluted to an oil concentration of 1%. Such a diluted emulsion becomes unstable and can be separated using the filtration unit described above.

The process according to this second embodiment offers the additional advantage, besides that of not adding any salt, of being applicable to any type of stabilized emulsion.

We claim:

1. A process for ultrafiltration of stabilized oil-in-water emulsions, comprising circulating the emulsion through a chamber separated by a porous membrane, wherein before the emulsion enters said chamber, alkaline earth metal halide salt is introduced into said chamber in an amount corresponding to a weight ratio of salt/oil present in the emulsion of between 0.01 to 0.2.

2. The process according to claim 1, wherein the salt is an alkaline earth metal chloride.

3. The process according to claim 2, wherein the salt is calcium chloride.

4. The process according to claim 3, wherein the amount of calcium chloride introduced into the emulsion produces a concentration in said emulsion between 0.1 to 1 kg/m3.

5. Process according to claim 2, wherein the salt is magnesium chloride.

* * * * *